United States Patent
Dennis (10) Patent No.: US 11,210,058 B2
(45) Date of Patent: Dec. 28, 2021

(54) SYSTEMS AND METHODS FOR PROVIDING INDEPENDENTLY VARIABLE AUDIO OUTPUTS

(71) Applicant: TV Ears, Inc., Spring Valley, CA (US)

(72) Inventor: George Joseph Dennis, Scottsdale, AZ (US)

(73) Assignee: TV Ears, Inc., Spring Valley, CA (US)

( * ) Notice: Subject to any disclaimer, the term of this patent is extended or adjusted under 35 U.S.C. 154(b) by 0 days.

(21) Appl. No.: 17/039,857

(22) Filed: Sep. 30, 2020

(65) Prior Publication Data

US 2021/0096812 A1 Apr. 1, 2021

Related U.S. Application Data

(60) Provisional application No. 62/908,190, filed on Sep. 30, 2019.

(51) Int. Cl.
| | |
|---|---|
| *G06F 3/16* | (2006.01) |
| *H04R 3/00* | (2006.01) |
| *H04R 1/10* | (2006.01) |
| *H04R 25/00* | (2006.01) |

(52) U.S. Cl.
CPC .......... *G06F 3/165* (2013.01); *H04R 1/1091* (2013.01); *H04R 3/00* (2013.01); *H04R 25/554* (2013.01); *H04R 2420/07* (2013.01)

(58) Field of Classification Search
CPC ......... G06F 3/165; H04R 1/1091; H04R 3/00; H04R 25/554; H04R 2420/07
See application file for complete search history.

(56) References Cited

U.S. PATENT DOCUMENTS

| | | |
|---|---|---|
| 7,149,469 B2 | 12/2006 | Russell |
| 7,415,005 B1 | 8/2008 | Macha et al. |
| 7,542,553 B2 | 6/2009 | Gurfein et al. |
| 7,996,040 B1 | 8/2011 | Timm |
| 8,229,748 B2 | 7/2012 | Chang et al. |
| 8,386,255 B2 | 2/2013 | Michaelis |
| 8,412,773 B1 | 4/2013 | Chapweske |
| 8,495,236 B1 | 7/2013 | Glasser |
| 8,505,054 B1 | 8/2013 | Kirley |
| 8,582,565 B1 | 11/2013 | Morsy et al. |
| 8,768,703 B2 | 7/2014 | Chang et al. |

(Continued)

FOREIGN PATENT DOCUMENTS

WO    WO 00/77655 A1    12/2000

OTHER PUBLICATIONS

International Search Report and Written Opinion issued in Application No. PCT/US2013/063498 dated Feb. 20, 2014.

(Continued)

*Primary Examiner* — Joseph Saunders, Jr.
(74) *Attorney, Agent, or Firm* — Leydig, Voit & Mayer, Ltd.

(57) ABSTRACT

A sound system for providing independently variable audio outputs is disclosed herein. The sound system may include a display device, an audio system, and a transmitter. The display device may receive an audio signal and transmit the audio signal to the audio system and the transmitter. The audio system may condition the audio signal based on different settings provided by users. The transmitter may wirelessly transmit conditioned audio signals to one or more audio devices.

19 Claims, 6 Drawing Sheets

(56) References Cited

U.S. PATENT DOCUMENTS

| | | | |
|---|---|---|---|
| 8,774,172 B2 | 7/2014 | Morsy et al. | |
| 9,800,977 B2 | 10/2017 | Dennis | |
| 9,936,297 B2 | 4/2018 | Dennis | |
| 2001/0046304 A1 | 11/2001 | Rast | |
| 2003/0208755 A1 | 11/2003 | Zimmerman | |
| 2005/0102703 A1 | 5/2005 | Querashi et al. | |
| 2006/0212897 A1 | 9/2006 | Li et al. | |
| 2006/0222155 A1 | 10/2006 | Summers et al. | |
| 2007/0204294 A1 | 8/2007 | Walker et al. | |
| 2008/0040116 A1* | 2/2008 | Cronin | G10L 21/0364 |
| | | | 704/261 |
| 2008/0134276 A1 | 6/2008 | Orrell et al. | |
| 2008/0181435 A1 | 7/2008 | Ozaki et al. | |
| 2008/0249874 A1 | 10/2008 | Seo | |
| 2008/0276266 A1 | 11/2008 | Huchital et al. | |
| 2008/0281990 A1 | 11/2008 | Wan | |
| 2009/0034450 A1 | 2/2009 | Urner | |
| 2009/0055385 A1 | 2/2009 | Jeon et al. | |
| 2009/0144361 A1 | 6/2009 | Nobakht et al. | |
| 2009/0160735 A1 | 6/2009 | Mack | |
| 2009/0164876 A1 | 6/2009 | Logan et al. | |
| 2009/0249407 A1 | 10/2009 | Manne et al. | |
| 2009/0252355 A1 | 10/2009 | Mao | |
| 2009/0318077 A1 | 12/2009 | Ghahramani | |
| 2010/0020978 A1 | 1/2010 | Garudadri | |
| 2010/0202621 A1 | 8/2010 | Murata | |
| 2010/0241432 A1 | 9/2010 | Michaelis | |
| 2010/0278159 A1 | 11/2010 | Khanduri | |
| 2010/0333156 A1 | 12/2010 | Abdolsalehi | |
| 2011/0043601 A1 | 2/2011 | Dye et al. | |
| 2011/0216928 A1* | 9/2011 | Eisenberg | H04R 25/00 |
| | | | 381/315 |
| 2012/0054796 A1 | 3/2012 | Gagnon et al. | |
| 2012/0079577 A1 | 3/2012 | Hao et al. | |
| 2012/0081501 A1 | 4/2012 | Benzaia et al. | |
| 2012/0117490 A1 | 5/2012 | Harwood et al. | |
| 2012/0166952 A1 | 6/2012 | Alexandrov et al. | |
| 2012/0284028 A1 | 11/2012 | Chang et al. | |
| 2012/0308032 A1 | 12/2012 | Ginn et al. | |
| 2012/0308033 A1 | 12/2012 | Ginn et al. | |
| 2012/0308035 A1 | 12/2012 | Ginn et al. | |
| 2012/0309366 A1 | 12/2012 | Ginn et al. | |
| 2012/0311642 A1 | 12/2012 | Ginn et al. | |
| 2012/0321112 A1 | 12/2012 | Schubert et al. | |
| 2012/0329420 A1 | 12/2012 | Zotti et al. | |
| 2013/0107029 A1 | 5/2013 | Knasel et al. | |
| 2013/0142332 A1 | 6/2013 | Ramos et al. | |
| 2013/0155318 A1 | 6/2013 | Boden et al. | |
| 2013/0162754 A1 | 6/2013 | Dye et al. | |
| 2013/0162755 A1 | 6/2013 | Swanson et al. | |
| 2013/0254802 A1 | 9/2013 | Lax et al. | |
| 2013/0254812 A1 | 9/2013 | McCoy et al. | |
| 2013/0258038 A1 | 10/2013 | Bychkov | |
| 2013/0291008 A1 | 10/2013 | Abed | |
| 2015/0063586 A1 | 3/2015 | Shah | |
| 2015/0195661 A1* | 7/2015 | Neumann | H04R 25/70 |
| | | | 381/60 |
| 2015/0280669 A1 | 10/2015 | Vilermo et al. | |
| 2015/0358767 A1 | 12/2015 | Luna et al. | |
| 2019/0090072 A1* | 3/2019 | Pedersen | H04R 25/505 |

OTHER PUBLICATIONS

Audivero website, http://www.audiovero.com, last accessed on Sep. 12, 2013, and Audivero application web page (available at https://play.google.com/store/apps/details?id=com.audivero.audivero&hl=en).

Faber et al., "Wi-Fi Enabled Assistive Listening Device for Home," (2010).

Hear My Lips Presentation, http://www.hearmylips.com/home.html, last accessed on Mar. 27, 2014.

Soundog Website, http://www.mysoundog.com/, last accessed on Mar. 27, 2014.

SoundDog App, https://play.google.com/store/apps/details?id=com.pingo.soundog2, updated Oct. 13, 2013.

Personal Listening App, https://play.google.com/store/apps/details?id=com.listentech.personallistening, updated Dec. 18, 2013.

JustSync app, https://play.google.com/store/apps/details?id=vs.syncast.com, updated Oct. 24, 2013.

JustSync Website, http://jsmgworldwide.com, last accessed on Mar. 27, 2014.

WAD WiFi Audio Distributor app, https://play.google.com/store/apps/details?id=com.cavsusa.ccastclient, updated Nov. 4, 2013.

CiNet.com website, http://www.cinet.com, last accessed on Mar. 27, 2014.

Solon, O., "Amazon plans headphones that know when someone says your name," The Guardian, https://www.theguardian.com/technology/2016/aug/01/amazon-noise-cancelling-headphones-know-your-name (Aug. 1, 2016).

* cited by examiner

SYSTEMS AND METHODS FOR PROVIDING INDEPENDENTLY VARIABLE AUDIO OUTPUTS

CROSS-REFERENCE TO RELATED APPLICATIONS

This application claims priority to U.S. Provisional Application No. 62/908,190, filed on Sep. 30, 2019, which is hereby incorporated by reference in its entirety.

BACKGROUND

The present disclosure generally relates to systems and methods of providing independently variable audio outputs. When consuming media, a first user suffering from some degree of hearing loss may wish to increase the volume of media that is playing. However, a second user who is not suffering hearing loss may not wish to increase the volume of the media that is playing. When such first and second users are consuming the same media, it may be difficult to provide a setting that satisfies the needs of both users.

SUMMARY

The embodiments disclosed herein each have several aspects no single one of which is solely responsible for the disclosure's desirable attributes. Without limiting the scope of this disclosure, some of the features of the disclosure will now be briefly discussed. After considering this discussion, and particularly after reading the section entitled "Detailed Description," one will understand how the features of the embodiments described herein provide advantages over existing systems, devices and methods for providing independently variable audio outputs.

One embodiment provides a system for generating independently variable audio outputs. The system includes an audio system and an audio device. The audio system comprises a processor and a transmitter, wherein the processor is configured to receive a first audio signal from a display device, wherein the audio system is configured to generate a first audio output based on the first audio signal, wherein the processor is configured to generate a second audio signal comprising a modified version of the first audio signal, and wherein the transmitter is configured to output the second audio signal. The audio device is configured to establish a wireless communication with the audio system and receive the second audio signal from the audio system via the transmitter, wherein the audio device is configured to generate a second audio output based on the second audio signal.

Another embodiment provides an audio system for generating independently variable audio outputs. The audio system comprises: a speaker configured to generate a first audio output based on a first audio signal; a processor configured to generate a second audio signal based on the first audio signal, the second audio signal distinguished from the first audio signal in at least one characteristic; and a transmitter configured to establish a wireless communication with and transmit the second audio signal to an audio device, the second audio signal used to generate a second audio output different from the first audio output.

Yet another embodiment provides a method of generating independently variable audio outputs. The method includes: receiving, by a receiver included in an apparatus, a first audio signal; generating, by a speaker included in the apparatus, a first audio output based on the first audio signal; generating, by a processor included in the apparatus, a second audio signal based on the first audio signal, the second audio signal distinguished from the first audio signal in at least one characteristic; and transmitting, by a transmitter included in the apparatus, the second audio signal to an audio device via a wireless communication, wherein the audio device is capable of outputting a second audio output based on the second audio signal.

The following disclosure describes non-limiting examples of some embodiments. For instance, other embodiments of the disclosed systems and methods may or may not include the features described herein. Moreover, disclosed advantages and benefits may apply only to certain embodiments of the invention and should not be used to limit the disclosure.

BRIEF DESCRIPTION OF THE DRAWINGS

Throughout the drawings, reference numbers are re-used to indicate correspondence between referenced elements. The drawings are provided to illustrate embodiments of the inventive subject matter described herein and not to limit the scope thereof.

DETAILED DESCRIPTION

The present disclosure incorporates by reference:
- U.S. Pat. No. 8,582,565 issued on Nov. 12, 2013 and entitled SYSTEM FOR STREAMING AUDIO TO A MOBILE DEVICE USING VOICE OVER INTERNET PROTOCOL, an application for which was filed on Mar. 29, 2013 under application Ser. No. 13/853,949;
- U.S. Pat. No. 8,774,172 issued on Jul. 8, 2014 and entitled SYSTEM FOR PROVIDING SECONDARY CONTENT RELATING TO A VOIP AUDIO SESSION, an application for which was filed on Mar. 15, 2013 under application Ser. No. 13/837,593;
- U.S. Pat. No. 9,936,297 issued on Apr. 3, 2018 and entitled HEADPHONE AUDIO AND AMBIENT SOUND MIXER, an application for which was filed on Nov. 15, 2016 under application Ser. No. 15/351,994; and
- U.S. Pat. No. 9,800,977 issued on Oct. 24, 2017 and entitled HEADPHONE AUDIO AND AMBIENT SOUND MIXER, an application for which was filed on Feb. 9, 2017 under Application Ser. No. 15/428,752.

Figure 1:
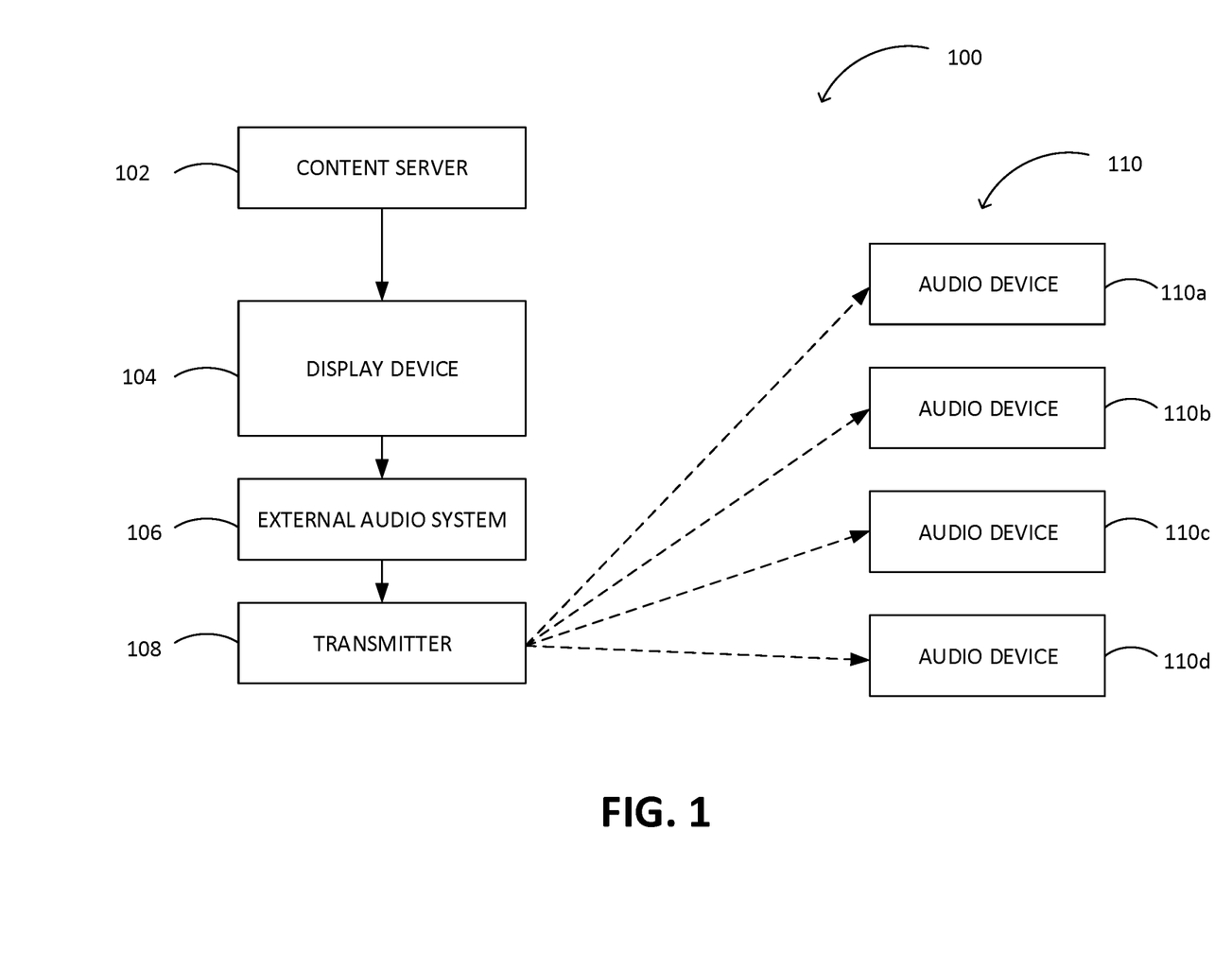
FIG. 1 is a schematic diagram of an embodiment of a sound system.
Figure 2:
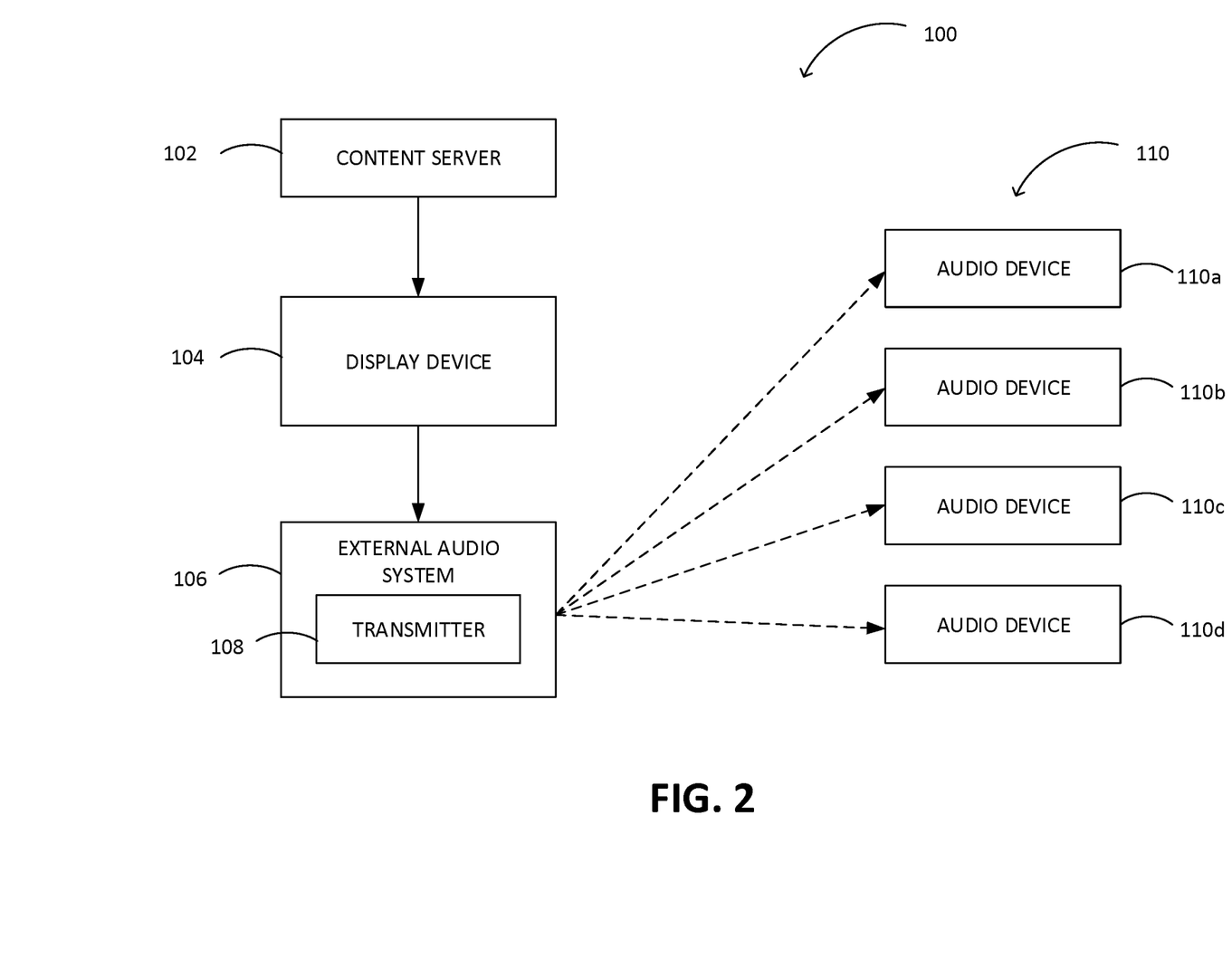
FIG. 2 is a schematic diagram of another embodiment of a sound system.
Figure 3:
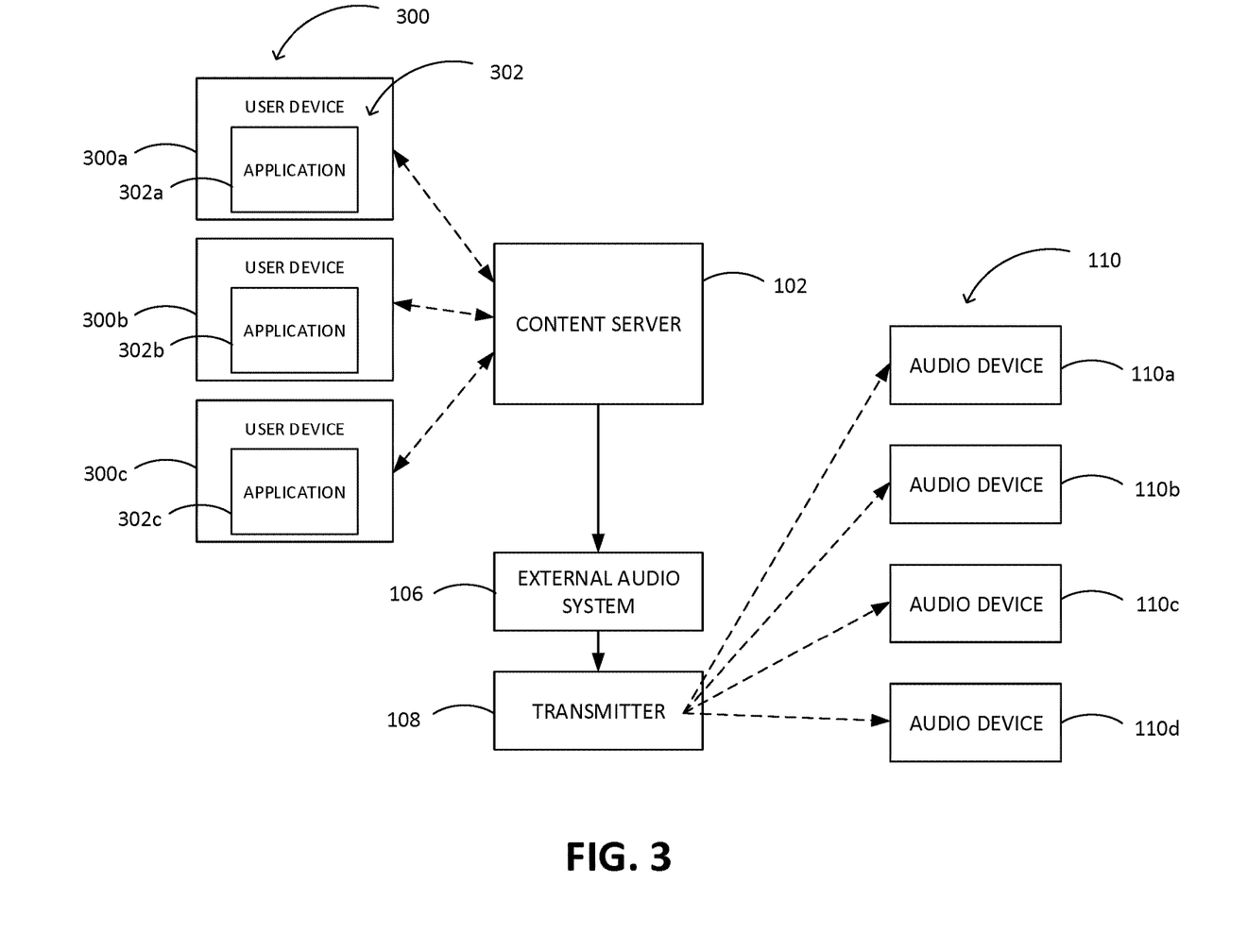
FIG. 3 is a schematic diagram of another embodiment of a sound system.

With reference to FIGS. 1-3, a sound system 100 for providing individually variable sound to different users or different speaker devices is disclosed. The sound system 100 may optionally include a display device 104. For example, the display device 104 may be a television, mobile device, tablet, projector, computer monitor, or other device capable of displaying images. The display device 104 receives signals corresponding to images for display from one or more content servers 102. The content server 102 may be located at a remote location and connected to the display device 104 over a network.

In some implementations, the signal from the content server 102 may include image signals and/or audio signals. The display device 104 may be connected to an external audio system 106, where a received in the external audio system 106 is capable of receiving signals from the display device 104 and/or content server 102. The external audio system 106 may be an external sound system such as a surround sound system or a soundbar. The external audio system 106 may provide improved sound quality for the display device 104. In some cases, the content server 102 may be directly connected to the external audio system 106. For example, the content server 102 may be a radio, audio media server, or other audio source that may provide audio content to a receiver included in the external audio system 106 in conjunction with or independent of a display device 104. In some embodiments, the external audio system 106 is integrated in the same apparatus as the display device 104. In some embodiments, the external audio system 106 comprises a set-top box, console, USB (universal serial bus) dongle, or other apparatus.

The sound system 100 may include a transmitter 108 connected to the external audio system 106. The transmitter 108 may be wirelessly connected to the external audio system 106 or be connected to the external audio system 106 via one or more wires. The transmitter 108 may receive audio signals from the external audio system 106 and transmit the audio signals to one or more audio devices 110a, 110b, 110c, 110d (collectively referred as audio devices 110).

Although four audio devices 110 are illustrated, in some implementations the system 100 may include more or fewer audio devices, such as 2, 3, 5, 10, or any other number of audio devices. The audio devices 110, for example, may be a headphone, speaker, personal speaker that is positioned near a user or listener, or any other device that may receive audio for output to a user. In some implementations, one or more of the audio devices 110 may be or may include a hearing aid.

Further, each of the audio devices 110 may be the same type of audio device or at least some of the audio devices 110 may differ in type and/or configuration. The audio signals transmitted from the transmitter 108 to the audio device 110 may be wirelessly transmitted or transmitted via one or more wires. In one example, the audio signal is transmitted from the transmitter 108 to the audio devices 110 via cables. Alternatively, or in addition, the transmitter 108 may be included in the same apparatus as the external audio system 106 and/or display device 104. FIG. 2 shows an implementation where the transmitter 108 is included in the same apparatus as the external audio system 106.

The audio signal transmitted from the transmitter 108 to the audio devices 110 may allow users to listen to the content that was provided to the display device 104 from the content server 102. The audio devices 110 may individually control different characteristics of the audio signal transmitted from the transmitter 108. For example, the audio devices 110 may change volume of the audio signal or the tune of the audio signal. The audio device 110 may be able to amplify treble or bass of the audio signal. Alternatively, or in addition, the audio device 110 may output the audio as it is received from the transmitter 108 without modifying the audio signal. In some embodiments, the external audio system 106 is configured to output an audio output (e.g., via one or more speakers) based on the received audio signal and/or after modifying the audio signal.

As stated above, in some cases, one or more of the audio devices 110 may be or may include a hearing aid. Some hearing aids may receive signals from the transmitter 108. For example, a hearing aid that supports Bluetooth® signals may receive a signal from a Bluetooth® transmitter. The Bluetooth® transmitter may be plugged into a content source, such as a display device 104. In certain aspects disclosed herein, the transmitter 108 may comprise a Bluetooth® transmitter capable of transmitting output from the external audio system 106 to one or more hearing aids (i.e., hearing aids included in one or more of the audio devices 110) that include a Bluetooth® receiver. Thus, in some implementations, a transmitter 108 included in (or attached to) an external audio system 106 (such as, e.g., a soundbar) may communicate wirelessly (e.g., via Bluetooth®) with a hearing aid to provide one or more of the features of the present disclosure. Although the above is described with respect to Bluetooth® capable hearing aids, In some embodiments, other wired or wireless communication standards or technologies may be used, such as, for example, Zigbee®.

In some implementations, the transmitter 108 may divide or chunk up an audio signal into transmittable packets or otherwise modify the audio signal. In other implementations, the transmitter 108 transmits a received audio signal without modifying the signal or fidelity of the received audio signal. In either implementation, the transmitter 108 may be used to enhance certain types of audio signals received from the display device 104 or the external audio system 106. Accordingly, although the external audio system 106 and/or the audio devices 110 may perform audio modification themselves, embodiments described herein for modifying the audio may be performed by the transmitter 108 in some implementations as well.

In some implementations, the external audio system 106 includes a processor or conditioning circuitry (see, e.g., FIG. 5) that is configured to modify a received audio signal received via a received included in the external audio system 106, such as by amplifying the volume of the received audio signal. In addition to amplifying or modifying the volume of the received audio signal, the external audio system 106 may also modify particular sets of frequencies associated with the audio signal. For example, the external audio system 106 may enhance certain frequencies while attenuating other frequencies within the audio signal. In some embodiments, the modification to the audio signal may be in addition to or independent of noise filtering. Further, the modification to the audio may be user-dependent, or based on preferences of a particular user and/or audio device 110, or the ability of a particular user to hear or distinguish sounds of particular frequencies.

In some implementations, the external audio system 106 includes a processor or conditioning circuitry that is configured to filter out certain types of audio signals, or frequencies associated with certain types of audio, including, but not limited to, voice audio signals and background audio signals, to amplify or attenuate the associated frequencies based on different settings or preferences.

As an example implementation, a first user may wish to enhance signals related to voice audio signals, or voice frequencies within the audio signals, while watching a football game on the display device 104. A second user, by contrast, may wish to attenuate signals related to voice audio signals, or voice frequencies, while watching the same game. Still further, a third user may wish to listen to the audio without any modification to the voice audio signals, or voice frequencies within the audio signals.

Based on different settings provided by different users (for example, through respective audio devices 110 corresponding to different users), the transmitter 108 may be able to condition audio signals received from the display device 104 or the external audio system 106 prior to transmitting them to different audio devices 110a, 110b, 110c, 110d. The audio devices 110a, 110b, 110c, 110d may each receive audio signals conditioned with different settings or the same setting. Signals received by audio devices 110a, 110b, 110c, 110d may vary from each other in volume, bass level, treble level, tone, and the like.

The audio signals transmitted to the audio devices 110 may be used to generate sound by using speakers. In some cases, the audio devices 110 are or include speakers. Further, in some implementations, the external audio system 106 includes or is a speaker. In some cases, the external audio system 106 outputs received audio via a speaker of the external audio system 106 without modifying the audio. In other cases, the external audio system 106 may modify the volume of the audio as a whole, rather than particular frequencies of the audio, and may output the modified audio via a speaker of the external audio system 106. In either of the previous example cases, the external audio system 106 may separately modify the audio, or not modify the audio, before outputting the audio via the transmitter 108 for transmission to one or more audio devices 110. Thus, in some cases, the external audio system 106 may output audio in one form via a speaker of the external audio system 106 while transmitting the audio in another form (e.g., different volume, different enhanced frequencies, different attenuated frequencies, etc.) to one or more audio devices 110 via the transmitter 108. In some cases, the external audio system 106 may transmit, or cause to be transmitted via the transmitter 108, different forms of the audio to different audio devices 110.

The audio signal received by the audio devices 110a, 110b, 110c, 110d may be different from or the same as the audio signal received by the display device 104. This may be advantageous in allowing the display device 104 (and/or external audio device 106) and the audio device 110a, 110b, 110c, 110d to generate independently variable audio outputs. For example, a given audio device 110 may generate or output audio output that is louder than audio output generated by the display device 104, or the external audio system 106, to, for example, accommodate a user with hearing loss associated with the given audio device 110. As another example, the given audio device 110 may generate or output audio with different enhanced or attenuated frequencies than audio output by the display device 104, the external audio system 106, or another audio device 110.

The external audio system 106 and the transmitter 108 may be separate or integrated together as a single apparatus. The external audio system 106 (for example, a soundbar) may be capable of conditioning audio signals based at least on different conditioning settings and transmit conditioned audio signals to different audio devices 110 via the transmitter 108.

In some implementations, the external audio system 106 or the transmitter 108 may receive audio signals directly from the content server 102. The external audio system 106 or the transmitter 108 may directly communicate with the content server 102 (for example, Apple Music®, Spotify®, a cable television service, a satellite television service, a streaming television service, or any other media service or provider) to receive an audio signal. Once the external audio system 106 or the transmitter 108 receives the audio signal from the content server 102, it may condition and transmit the audio signal to different audio devices 110 (for example, headphones).

Referring to FIG. 3, the content server 102 may provide audio signals or video signals to the external audio system 106 in response to a request sent from one or more user devices 300a, 300b, 300c (which may individually or collectively be referred to as user device(s) 300). In various implementations, the user devices 300 comprise mobile phones, tablets, or computers. The request may be generated and transmitted to the content server 102 by applications 302a, 302b, 302c operating on the user devices 300a, 300b, 300c, respectively. Once the content server 102 receives requests from the applications 302a, 302b, 302c, the content server 102 may, in response, provide audio or video signal to the external audio system 106 or the transmitter 108. In some cases, the user devices 300 may receive content (e.g., audio and/or video) from a content server 102 or content source and provide the content to the external audio system 106. In some cases, the external audio system 106 may be a content source. For example, audio and/or video may be stored in a non-volatile memory of the external audio system 106.

In one embodiment, audio devices 110a, 110b, and 110c correspond to user devices 300a, 300b, and 300c, respectively. In one implementation, one or more of the audio devices 110 is integrated into the corresponding user device 300. In another implementation, one or more of the audio devices 110 is a separate apparatus than the corresponding user device 300 (e.g., audio device 110a comprises headphones and user device 300a comprises a mobile phone, where the headphones are plugged into a port of the mobile phone).

Figure 4:
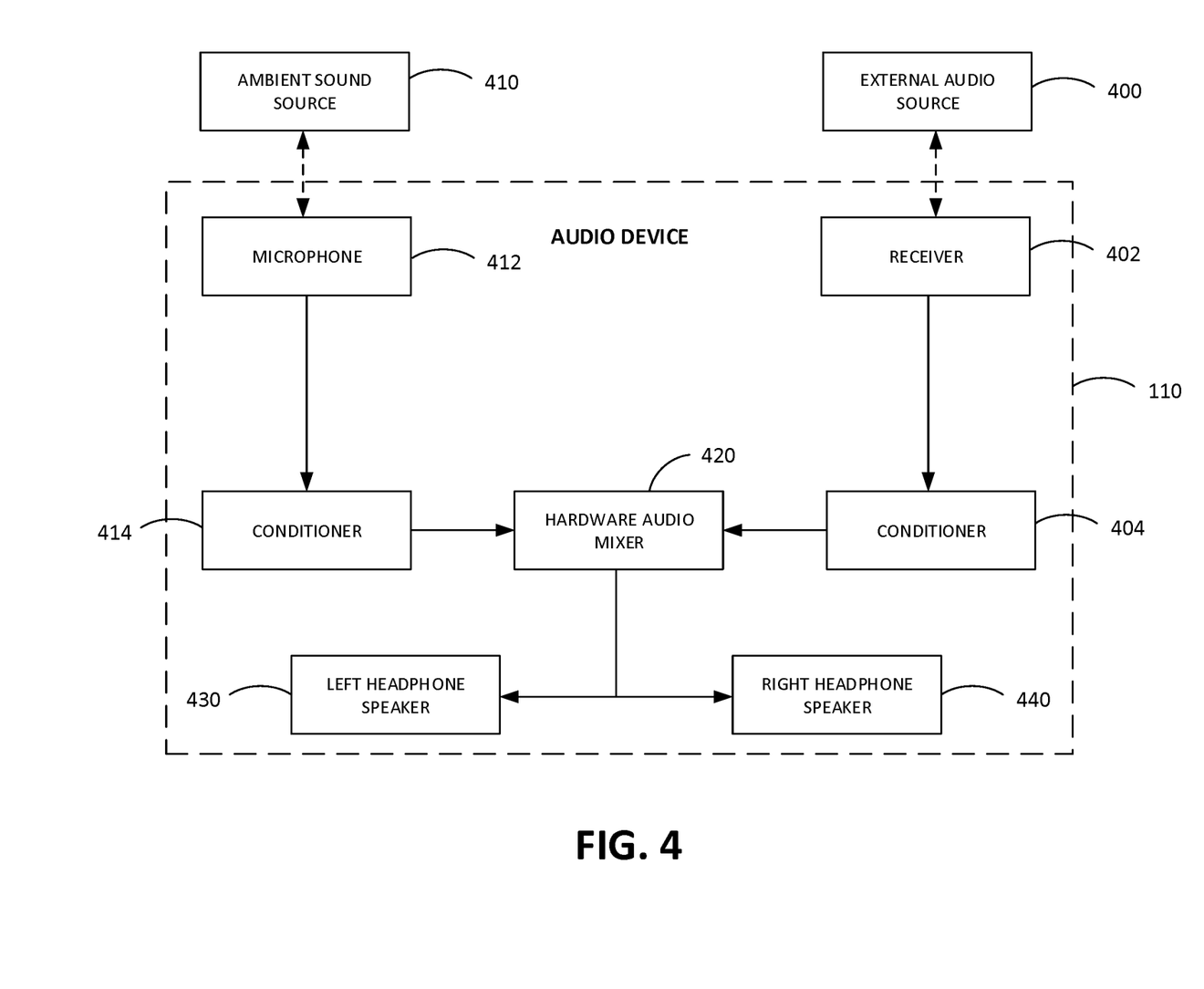
FIG. 4 is a schematic diagram of an embodiment of an audio device used with a sound system.
Figure 5:
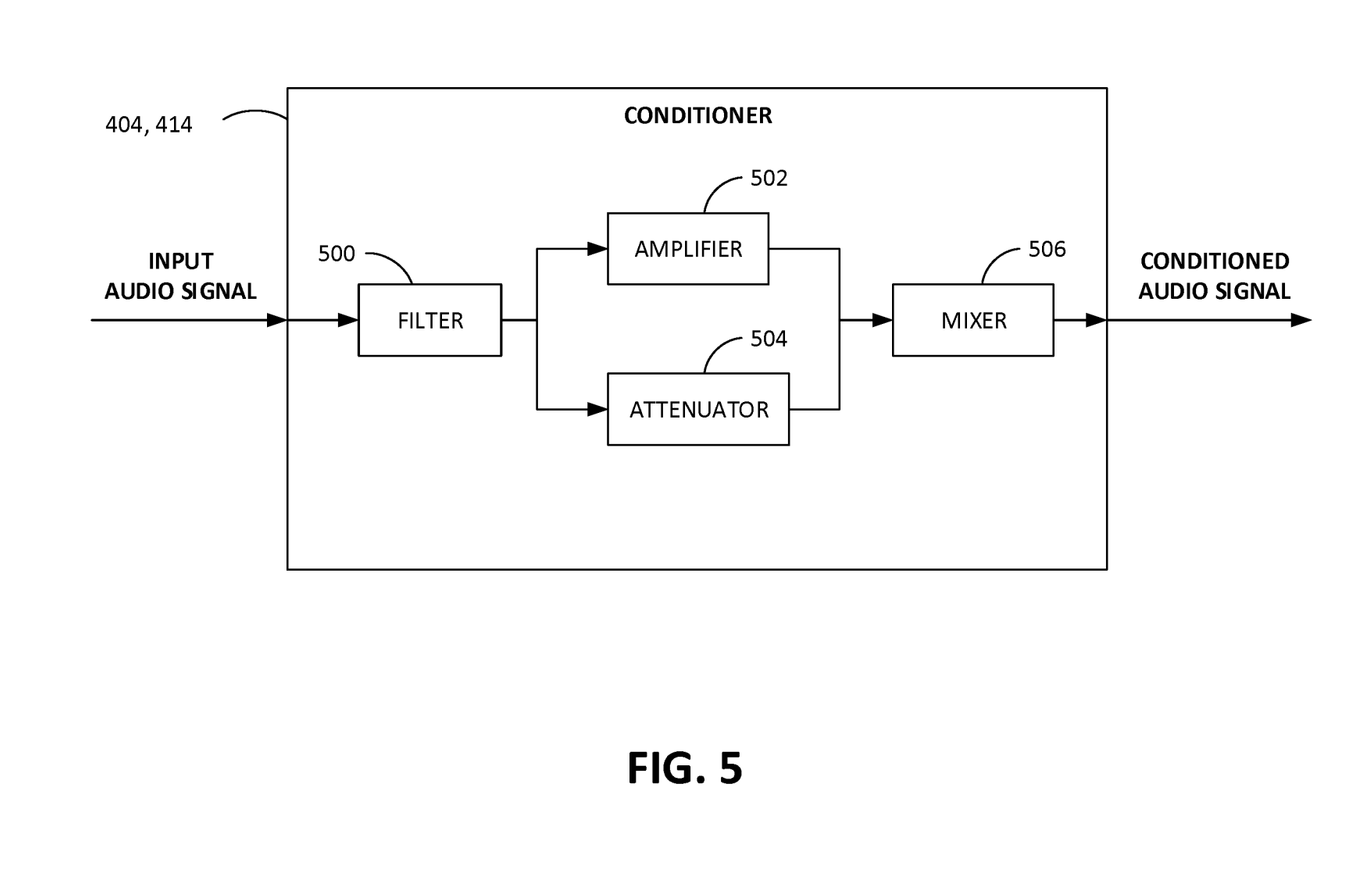
FIG. 5 is a schematic diagram of an embodiment of a conditioner.

FIGS. 4 and 5 illustrate non-limiting examples of an audio device 110. In some embodiments, the audio device 110 may differ from those examples illustrated in FIGS. 4 and 5.

In some embodiments, the audio devices 110 may be speakers that do not include any signal processing capability beyond what may be included to output received audio. In other embodiments, the audio devices 110 may include at least some of the functionality of the external audio system 106. In some embodiments, the audio devices 110 may modify audio based on control signals received from the external audio system 106 or based on settings of the audio device 110. Further, in some embodiments, at least some of the audio devices 110 may be configured differently or have different capabilities than at least some other of the audio devices 110.

Referring to FIG. 4, in some embodiments, one or more of the audio devices 110 may further condition or modify audio signals received from an external audio source 400. The external audio source 400 may be the external audio system 106, the transmitter 108, or any other system that may provide audio to the audio device 110. As disclosed herein, the audio device 110 may be a headphone, personal speaker system, or other type of speaker. In some cases, one or more features of the audio device 110 may be integrated into a hearing aid.

The audio device 110 may include a receiver 402 to receive audio signals from the external audio source 400. The audio signals may be, as disclosed herein, received from the external audio system 106 or the transmitter 108. The audio devices 110 may receive audio signals via cables or wirelessly. Once the receiver 402 receives audio signals, the receiver 402 may transmit the audio signals to a conditioner 404. The conditioner 404 may be, or may include, a digital signal processor or other processor, or circuit that may modify the audio signal. The conditioner 404 may be dedicated to the receiver 402. The conditioner 404 may condition the audio signal based on different settings provided by a user. The different settings may include volume, bass, treble, tone, and the like. Further, the conditioner 404, or digital signal processor, may include the ability to filter particular audio frequencies, amplify or enhance particular audio frequencies (such as those associated with voice), attenuate or reduce particular audio frequencies (such as those associated with explosions and other loud special effects that may interference with voices or music), or any other type of modification that may enhance certain frequencies or reduce certain frequencies. Once the audio signals are conditioned, the conditioner 404 may transmit the conditioned audio signal to a hardware audio mixer 420. The mixer 420 may then transmit the conditioned audio signal to a left headphone speaker 430 and a right headphone speaker 440. Alternatively, or in addition, the conditioned or modified audio signals may be output by the headphone speakers 430, 440 without further mixing or modification. In some embodiment, one or more than two speakers are included in the audio device that outputs the conditioned audio signal from the hardware audio mixer. In various implementations, the audio signals output by various speakers of the audio device 110 may be the same or different.

The audio device 110 may also include a microphone 412 that may receive ambient sound from an ambient sound source 410. The microphone 412 may capture different types of ambient sounds such as voices, horns, doorbells, sirens, car traffic, background noises (for example, wind), and the like. Once the microphone 412 captures the ambient sound, the ambient sound may be transmitted to a conditioner 414. As with the conditioner 404, the conditioner 414 may be a digital signal processor other processor, or other circuit configured to modify and/or filter audio signals. The conditioner 414 may be dedicated to the microphone 412 or may be shared between the receiver 402 and the microphone 412. The conditioner 414 may condition the ambient sound based on different settings and output a conditioned audio signal to the hardware audio mixer 420 for output by one or more speakers.

FIG. 5 is a schematic diagram of an embodiment of a conditioner, such as conditioner 404 and/or conditioner 414. The conditioners 404, 414 may include an amplifier 502 that may amplify signals that satisfy one or more criteria. For example, the amplifier may amplify signals associated with voices. In such an example, the user may be able to listen to nearby ambient voices while listening to media content. In another example, the amplifier 502 may amplify signals associated with alarms or honks. In such example, the user may be able to listen to media content (e.g., sports game, music, or movie) while being able to hear alarms or horns via the audio device 110.

The conditioners 404, 414 may include an attenuator 504. The attenuator 504 may attenuate or mute certain types of sounds. For example, the attenuator 504 may attenuate or mute certain types of noises such as background or ambient noises. The conditioners 404, 414 may include both the attenuator 504 and the amplifier 502 to condition audio signals captured and received by the audio device 110 based on different user settings. The conditioners 404, 414 may include a mixer 506 that may mix amplified signals from the amplifier 502 and attenuated signals from the attenuator 504. The mixer 506 may mix the signals based on the different settings provided by the user.

The audio devices 110 may include headsets or headphones capable of mixing multiple audio sources and/or capable of modifying an audio signal (e.g., emphasizing voice frequencies or de-emphasizing non-voice frequencies). Alternatively, or in addition, the audio devices 110 may include traditional headphones that output audio without modifying the audio signals. The audio devices 110 may communicate wirelessly or in a wired manner with the external audio system 106.

The conditioners 404, 414 may also include a filter 500 that may filter different types of audio signals. The filter 500 may receive an input audio signal and filter different types of audio signals (for example, voices, music, sound effects, door bells, car noise, or alarms) based on a set of predetermined frequencies, frequencies identified by a user, or frequencies determined to be associated with sound flagged or identified by a user. The filter 500 may utilize audio signal amplitudes to determine which signals to filter out. For example, the filter 500 may be able to filter out distant (e.g., voices originating from more than a particular distance, such as 50 or 100 feet) voices from nearby voices (e.g., voices originating from less than a particular distance, such as 25, 50, or 75 feet) to determine which audio signal is a background noise and which audio signal is not a background noise, such as audio signals generated from a person talking to a user.

The conditioners 404, 414 may be a part of the external audio system 106 or the transmitter 108. Alternatively, or in addition, the audio devices 110 may include the conditioners 404, 414.

The filter 500 may be used to sensor certain types of words based on different user settings. It may be advantageous for users to prevent their children from being exposed to certain types of words. In addition to receiving audio or video signals, the sound system 100 may use one of its components (for example, external audio system 106 or the transmitter 108) to receive recording files. Based on the recording files, the sound system 100 may use different filtering schemes to sensor certain types of words in advance. In some examples, the filtering may be done prior to playing an audio or video file. In other examples, the filtering may be done a predetermined time prior to a real-time audio or video feedback.

In various implementations, one or more of the filter 500, amplifier 502, attenuator 504, or the mixer 506 may be a digital signal processor other processor, or other circuit configured to receiver, modify, and/or output an audio signals.

Different settings for conditioning audio signals may be stored within the transmitter 108. The settings also may be stored in the external audio system 106 or in a remote server. The remote server may be a cloud-based server that a user may access via different wireless communication protocols including but not limited to 3G, 4G, 4G LTE, Wi-Fi, and the like. The different settings may be stored in the audio devices 110. The settings for conditioning and mixing different types of audio signals as described herein may be accessed or edited via the audio devices 110a, 110b 110c, 110d. In some examples, the settings may be accessed or edited via applications (e.g., applications 302a, 302b, 302c), or mobile or wireless devices (e.g., user devices 300a, 300b, 300c) having access to different devices of the external audio system 106, the transmitter 108, the audio device 110a, or the remote server.

In some embodiments, different priority schemes may be utilized to control application of different setting for the audio devices 110. For example, the audio device 110a may be set as a master device and other audio devices 110*b*, 110*c*, 110*d* may be set as slave devices. In such a configuration, different filters (for example, sound or word filters) or conditioning schemes may be applied using the audio device 110*a* and the same setting may be applied to other audio devices 110*b*, 110*c*, 110*d*.

In some embodiments, the transmitter 108 may directly or indirectly receive power from the display device or the external audio system.

In some embodiments, the transmitter 108 may directly or indirectly receive audio signals from the display device 104 or the external audio system 106. As described herein, the transmitter may wirelessly receive audio signals. The transmitter may utilize different types of wireless communication protocols including, but not limited to, near-field communication (NFC), Bluetooth®, Wi-Fi, Zigbee, and the like.

In some embodiments, the external audio system 106 or the transmitter 108 may be operated via a remote device (for example, a remote controller). The external audio system 106 or the transmitter 108 may display what settings (for example, filter or conditioning settings for audio signals) are currently being applied by the user. In some examples, the display device 104 may display what setting are being applied. Different types of displays may be used to display different setting being used. In one implementation, different colored light scheme may be used to show what settings are being used. For example, a blue light may be used to show that a filtering or conditioning setting associated with amplifying voices in an audio signal is being utilized, and a red light may be used to show that a filtering or conditioning setting associated with attenuating loud sound effects in an audio signal is being utilized.

The external audio system 106 or the transmitter 108 may be used as a charging station for the audio devices 110. The charging may be done via cables or wirelessly. The external audio system 106 or the transmitter 108 may function as a dock for the audio devices 110. The audio devices 110 may be charged while they are docket with the external audio system 106 or the transmitter 108.

Figure 6:
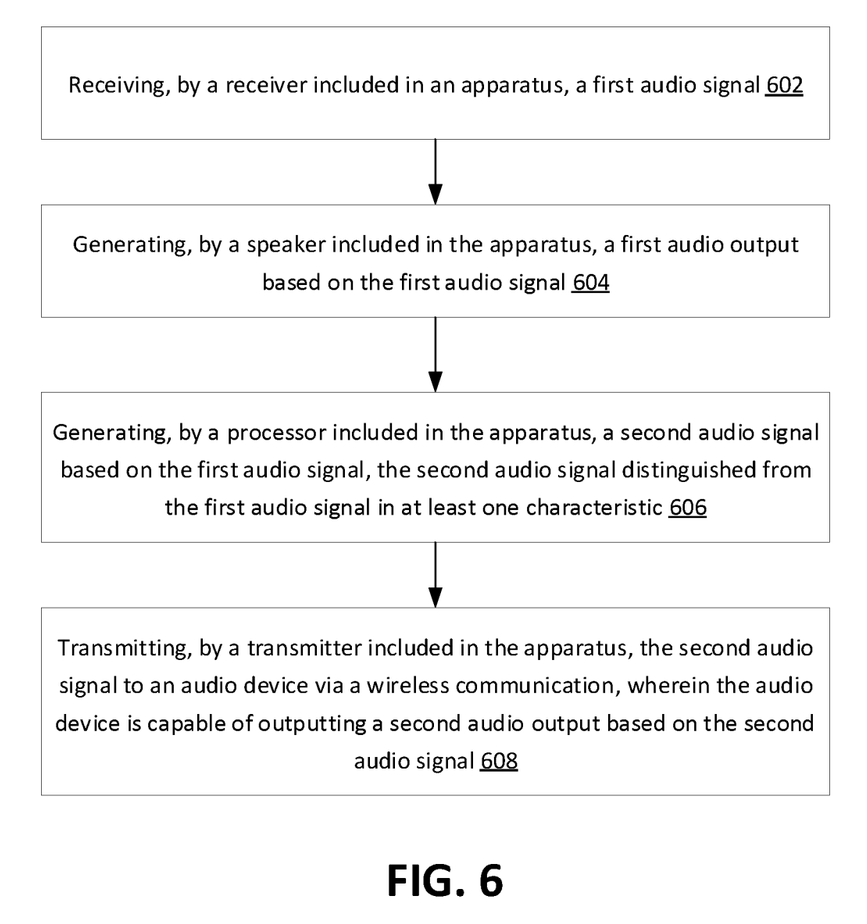
FIG. 6 is a method of an embodiment for generating independently variable audio outputs.

FIG. 6 is a method of an embodiment for generating independently variable audio outputs. The method of FIG. 6 is performed by an apparatus, which may be an apparatus embodying the external audio system 106.

At step 602, the method includes receiving, by a receiver included in the apparatus, a first audio signal. In various embodiments, the first audio signal is received from the display device 104 or a content server 102.

At step 604, the method includes generating, by a speaker included in the apparatus, a first audio output based on the first audio signal.

At step 606, the method includes generating, by a processor included in the apparatus, a second audio signal based on the first audio signal, the second audio signal distinguished from the first audio signal in at least one characteristic. Step 606 can also be performed by conditioning circuitry included in the apparatus. In one embodiment, generating the second audio signal comprises: separating the first audio signal into at least a first portion and a second portion using a filter, attenuating or amplifying the first portion to generate a modified first portion, and combining the modified first portion with the second portion to generate the second audio signal.

At step 608, the method includes transmitting, by a transmitter included in the apparatus, the second audio signal to an audio device via a wireless communication, wherein the audio device is capable of outputting a second audio output based on the second audio signal. As described, in some embodiments, the audio device can perform further audio processing on the received second audio signal before outputting an audio output. In other embodiments, the audio device can output an audio output based on the received second audio signal without any further signal processing.

Terminology

In some embodiments, not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code or instructions executed by a computing system that includes one or more computers or processors. The code or instructions may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein may be performed in a different sequence, may be added, merged, or left out altogether (e.g., not all described acts or events are necessary for the practice of the algorithms). Moreover, in certain embodiments, acts or events may be performed concurrently, e.g., through multi-threaded processing, interrupt processing, or multiple processors or processor cores or on other parallel architectures, rather than sequentially. In addition, different tasks or processes may be performed by different machines and/or computing systems that may function together.

The various illustrative logical blocks and modules described in connection with the embodiments disclosed herein may be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor may be a microprocessor, but in the alternative, the processor may be a controller, microcontroller, or state machine, combinations of the same, or the like. A processor may include electrical circuitry configured to process computer-executable instructions. In another embodiment, a processor includes an FPGA or other programmable device that performs logic operations without processing computer-executable instructions. A processor may also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment may include any type of computer system, including, but not limited to, a computer system based on a microprocessor, a mainframe computer, a digital signal processor, a portable computing device, a device controller, or a computational engine within an appliance, to name a few.

Conditional language such as, among others, "may," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices may also be collectively configured to carry out the stated recitations. For example, "a processor configured to carry out recitations A, B and C" may include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for generating independently variable audio outputs, the system comprising:
    an audio system comprising:
        a receiver configured to receive a first audio signal from an external audio source;
        a microphone is configured to receive ambient sound of the audio system;
        first conditioning circuitry configured to generate a modified first audio signal comprising a modified version of the first audio signal, wherein the first conditioning circuitry amplifies or attenuates one or more frequencies of the first audio signal to generate the modified first audio signal;
        second conditioning circuitry configured to generate a modified second audio signal comprising a modified version of a second audio signal, wherein the second conditioning circuitry includes a filter configured to filter out one or more frequencies of the second audio signal having signal amplitudes below a threshold corresponding to ambient sounds originating a particular physical distance away from the audio system to generate the modified second audio signal;
        audio mixing circuitry configured to mix the modified first audio signal and the modified second audio signal to generate an output audio signal for output by a first set of speakers of the audio system; and
        a transmitter configured to transmit the output audio signal; and
    an audio device configured to establish a wireless communication with the audio system and receive the output audio signal from the audio system via the transmitter, wherein the audio device includes third conditioning circuitry configured to generate a modified output audio signal based on the output audio signal, and wherein the audio device further includes a second set of speakers configured to output the modified output audio signal.

2. The system of claim 1, wherein the first set of speakers of the audio system outputs the output audio signal simultaneously with the second set of speakers of the audio device outputting the modified output audio signal.

3. The system of claim 1, wherein the output audio signal and the modified output audio signal are different in at least one characteristic, and wherein the at least one characteristic includes at least one of: volume, bass level, treble level, tone, amplitude, or signal strength of one or more frequencies included in the output audio signal or the modified output audio signal.

4. The system of claim 1, wherein the external audio source comprises a display device, wherein the audio system is a speaker system external to the display device, and wherein the audio system is configured to modify sound output of the display device.

5. The system of claim 1, wherein the audio device comprises a headset, a headphone, or a hearing aid.

6. The system of claim 1, wherein the first conditioning circuitry comprises one or more of:
    an attenuator configured to reduce amplitude of audio signals; or
    an amplifier configured to increase amplitude of audio signals.

7. The system of claim 1, wherein the third conditioning circuitry further comprises one or more of:
    a filter configured to separate audio signals of different frequencies; or
    a mixer configured to mix different audio signals.

8. The system of claim 1, wherein the external audio source receives the first audio signal from a remote server.

9. An audio system for generating independently variable audio outputs, the audio system comprising:
    a receiver configured to receive a first audio signal from an external audio source;
    a microphone is configured to receive ambient sound of the audio system;
    first conditioning circuitry configured to generate a modified first audio signal comprising a modified version of the first audio signal, wherein the first conditioning circuitry amplifies or attenuates one or more frequencies of the first audio signal to generate the modified first audio signal;
    second conditioning circuitry configured to generate a modified second audio signal comprising a modified version of a second audio signal, wherein the second conditioning circuitry includes a filter configured to filter out one or more frequencies of the second audio signal having signal amplitudes below a threshold corresponding to ambient sounds originating a particular physical distance away from the audio system to generate the modified second audio signal;

audio mixing circuitry configured to mix the modified first audio signal and the modified second audio signal to generate an output audio signal for output by a first set of speakers of the audio system; and a transmitter configured to establish a wireless communication with and transmit the output audio signal to an audio device, wherein the audio device includes a second set of speakers configured to output a modified version of the output audio signal.

10. The audio system of claim 9, wherein the first set of speakers of the audio system outputs the output audio signal simultaneously with the second set of speakers of the audio device outputting the modified version of the output audio signal.

11. The audio system of claim 9, wherein first conditioning circuitry comprises one or more of:
    an attenuator configured to reduce amplitude of audio signals; or
    an amplifier configured to increase amplitude of audio signals.

12. The audio system of claim 9, wherein the external audio source comprises a display device and the audio system comprises a soundbar.

13. The audio system of claim 9, wherein the audio device comprises third conditioner circuitry configured to attenuate or amplify different portions of the output audio signal transmitted from the audio system to generate the modified version of the output audio signal for output by the second set of speakers.

14. The audio system of claim 9, wherein the modified version of the output audio signal is different in at least one characteristic from the output audio signal, the at least one characteristic including at least one of: volume, bass level, treble level, or tone.

15. A method of generating independently variable audio outputs, the method comprising:
    receiving, by a receiver included in an apparatus, a first audio signal from an external audio source;
    receiving, by a microphone included in the apparatus, ambient sound of the apparatus;
    generating, by first conditioning circuitry included in the apparatus, a modified first audio signal comprising a modified version of the first audio signal, wherein the first conditioning circuitry amplifies or attenuates one or more frequencies of the first audio signal to generate the modified first audio signal;
    generating, by second conditioning circuitry included in the apparatus, a modified second audio signal comprising a modified version of a second audio signal, wherein the second conditioning circuitry includes a filter configured to filter out one or more frequencies of the second audio signal having signal amplitudes below a threshold corresponding to ambient sounds originating a particular physical distance away from the audio system to generate the modified second audio signal;
    mixing, by audio mixing circuitry included in the apparatus, the modified first audio signal and the modified second audio signal to generate an output audio signal for output by a first set of speakers of the audio system; and
    transmitting, by a transmitter included in the apparatus, the output audio signal to an audio device via a wireless communication, wherein the audio device includes a second set of speakers configured to output a modified version of the output audio signal.

16. The method of claim 15, wherein the first set of speakers of the audio system outputs the output audio signal simultaneously with the second set of speakers of the audio device outputting the modified version of the output audio signal.

17. The method of claim 15, wherein the modified version of the output audio signal is different in at least one characteristic from the output audio signal, the at least one characteristic including at least one of: volume, bass level, treble level, or tone.

18. The method of claim 15, wherein generating the modified first audio signal comprises:
    separating the first audio signal into at least a first portion and a second portion using a filter;
    attenuating or amplifying the first portion to generate a modified first portion; and
    combining the modified first portion with the second portion to generate the modified first audio signal.

19. The method of claim 15, wherein the external audio source comprises a display device and the apparatus comprises a soundbar.

* * * * *